UNITED STATES PATENT OFFICE 2,105,541

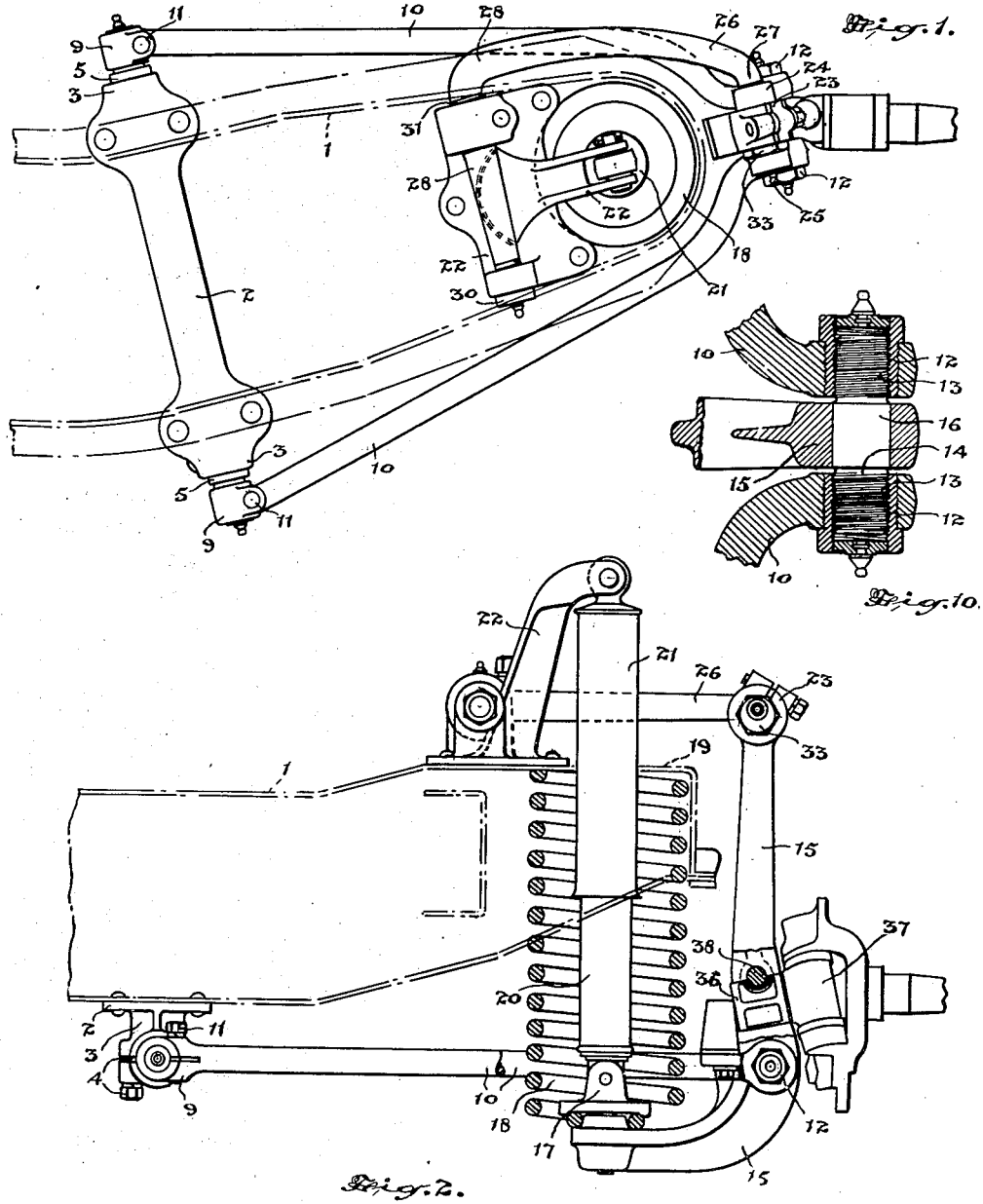

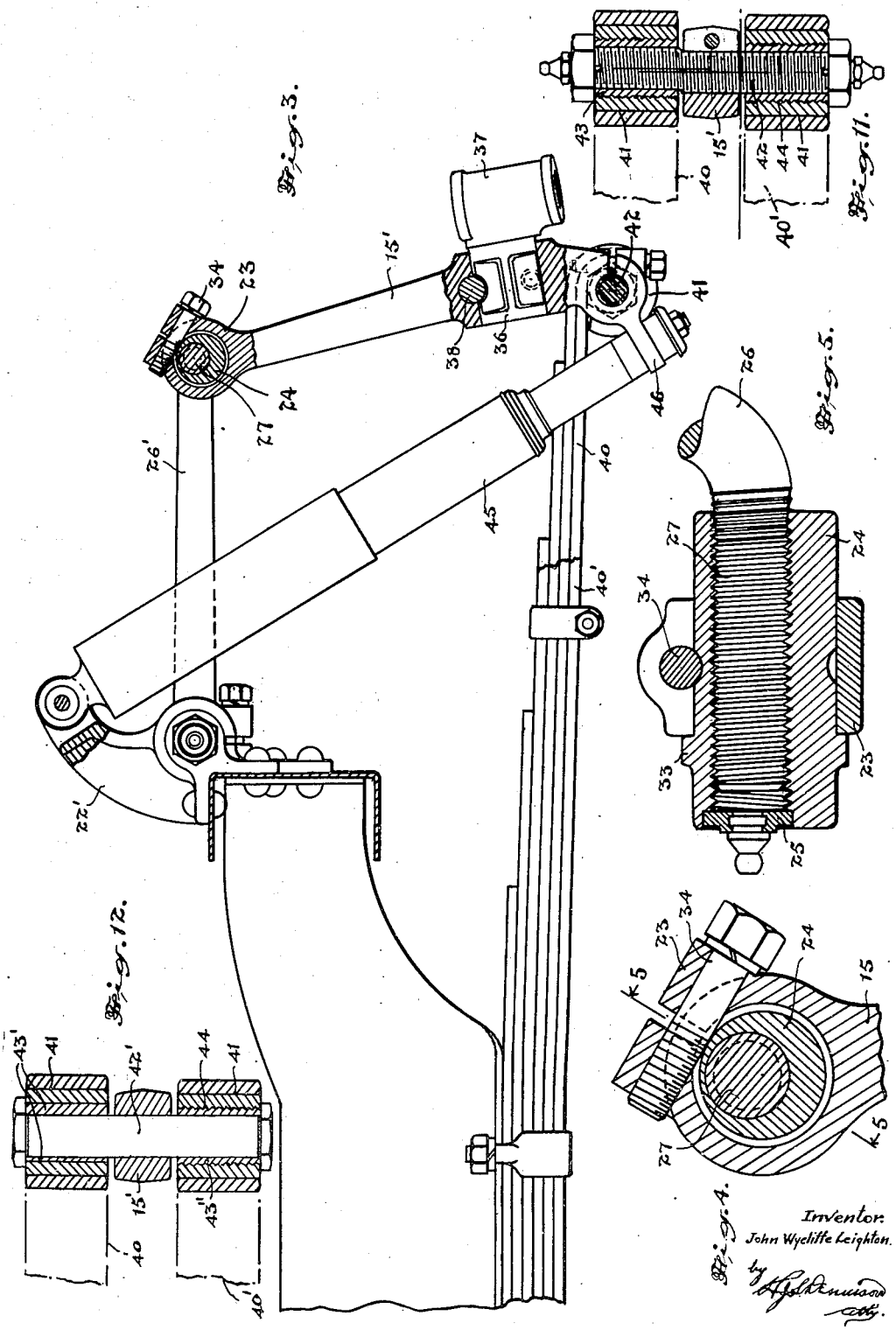

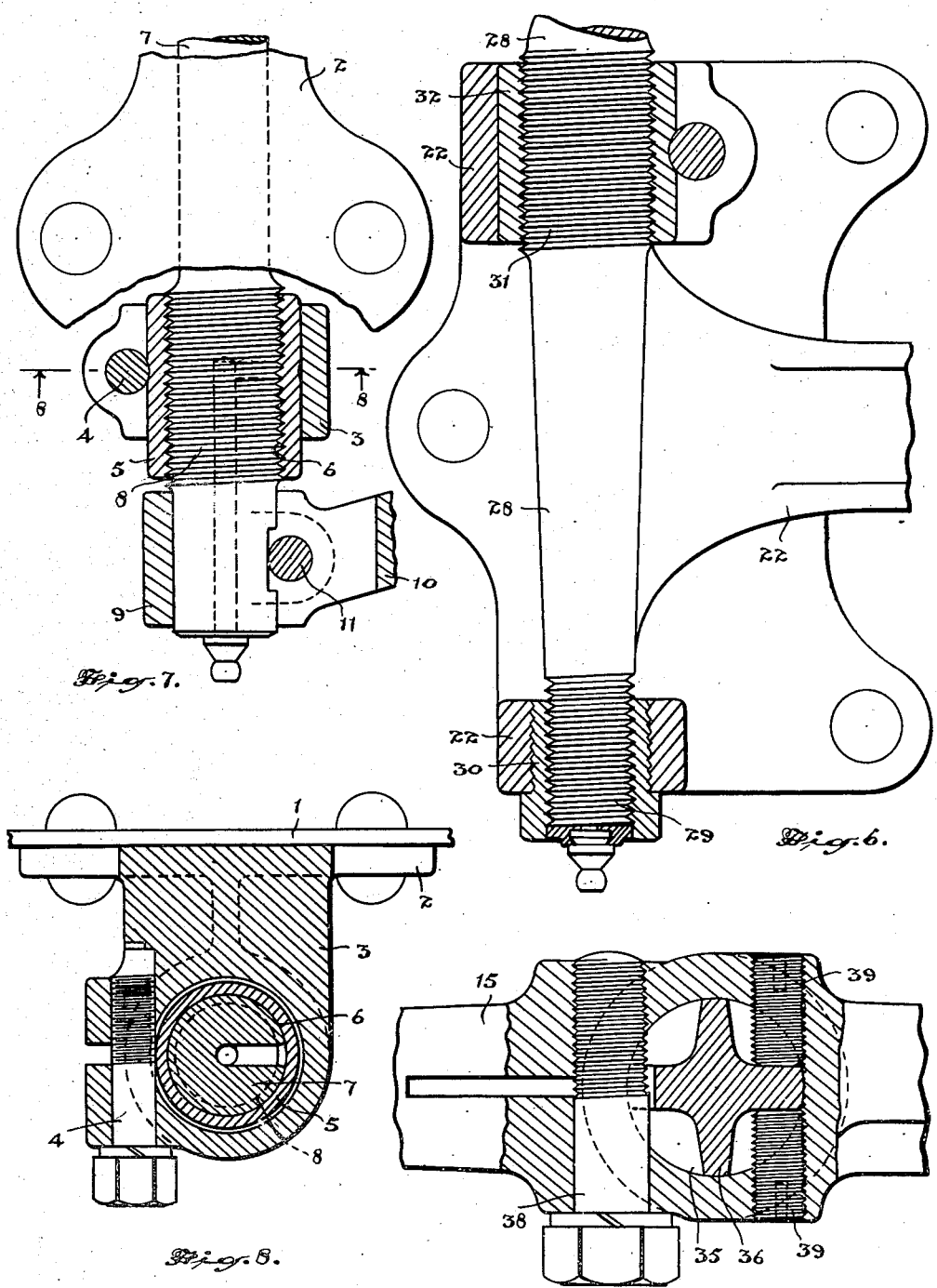

WHEEL SUSPENSION FOR MOTOR VEHICLES

John Wycliffe Leighton, Port Huron, Mich.

Application July 2, 1934, Serial No. 733,487

25 Claims. (Cl. 280—96.2)

The principal objects of the invention are to provide a structure which will be extremely resilient and will readily respond to road shocks, relieving the vehicle from resultant stress, and further, to devise a structure which may be very readily adjusted to alter both the "castor" and "camber" of the wheels.

A still further object is to devise a structure which may be assembled in the greater part separate from the vehicle and very easily and quickly attached thereto, and to overcome difficulties of assembly due to unavoidable inaccuracies in manufacture of certain of the parts.

The principal features of the invention consist in the novel construction and arrangement of parts whereby the vehicle frame and the load carried thereby is spring supported upon an arrangement of arms hingedly connected together and supported from an axle and wheel assembly, at least one of the hinged joints being eccentrically mounted for adjustment to vary the angularity of the wheel axle in relation to the frame.

A further and very important feature resides in the novel manner of supporting a "floating" axle carrying member at one end by means of a single bowed or U-shaped arm capable of resilient deflection or minor deflection to relieve excessive shock impact and provide for a limited castor adjustment in conjunction with a leaf spring support for the lower end of the "floating" member.

A still further and important feature resides in the novel provision of an adjustable eccentric connection between the "floating" axle carrying member and the respective eye ends of a pair of transverse supporting springs.

In the accompanying drawings, Figure 1 is a plan view of one form of assembly for the improved wheel suspension.

Figure 2 is a front elevational and part sectional view of the structure illustrated in Figure 1.

Figure 3 is a front elevational view of a modified form of structure shown partly in section.

Figure 4 is an enlarged cross sectional view of the eccentrically adjusted bearing joint.

Figure 5 is a longitudinal sectional view of the upper adjustable bearing joint taken on line 5—5 in Figure 4.

Figure 6 is an enlarged plan sectional detail of the frame end connection for the upper hinged arm.

Figure 7 is an enlarged plan sectional detail of the frame end connection of the lower hinged arm illustrated in Figures 1 and 2.

Figure 8 is a cross section through the line 8—8 of Figure 7.

Figure 9 is an enlarged sectional view of the adjustable support for the king pin connection to the jointed arm supports.

Figure 10 is an enlarged sectional view of the threaded bearing support of the outer ends of the lower rods connecting the vehicle frame with the wheel assembly.

Figure 11 is a sectional plan view of the eye end portions of the paired transverse springs showing a compensating form of coupling between the respective eyes and king pin support member.

Figure 12 is a view similar to Figure 11 illustrating a further modified form of compensating connection.

Numerous forms of structures for the individual front wheel suspension of motor vehicles have been devised and several varieties of these are in common use, but there is considerable room for improvement, both in the resilient reaction of the support and the adaptability to adjust it, as well as the facility for assembly which is extremely important in present day motor vehicle construction.

According to the form of the invention illustrated in Figures 1, 2, 7, 8 and 10, the vehicle frame I has secured at either side of the centre line and preferably arranged at an acute angle thereto, a bracket member 2 which is provided with a pair of downwardly extending lugs 3, each of which is split longitudinally and provided with a binding bolt 4.

Mounted in each of the split lugs 3 is a bushing 5 provided with an internally threaded surface 6 and a bar 7 provided with a threaded portion 8 adjacent to each end is rotatably mounted in the threaded bushings.

The outer ends of the rod beyond the threaded portions are slightly reduced and may be slightly tapered to receive the bored and slotted ends 9 of the spacing arms 10 which extend in a substantially horizontal direction outwardly.

Clamping bolts 11 extend through the slotted ends of the arms 10 and key the said arms on the ends of the pivot bar 7.

The arms 10 converge toward the outer ends and are provided with bushings 12 preferably secured therein with an external locking thread and having their inner surfaces threaded to form threaded bearing surfaces 13 for a pivot stud 14 extending therebetween.

An arm—or upright "floating" member 15 is secured on the central cylindrical portion 16 of the pivot stud 14 and is of substantially right angular formation, the lower end extending inwardly below the level of the arms 10.

To the inner end of the arm 15 is secured a cap 17 which secures the lower end of a coil compression spring 18 to said arm, the upper end of the spring bearing against the underside of the frame 19 of the vehicle and carrying the load.

A cylindrical plunger 20 is pivotally mounted on the cap 17 and extends upwardly through the spring 18 and through an opening in the frame and the upper end thereof is enclosed by air-cushioning cylinder 21, the latter being pivotally connected at its upper end to a bracket 22 mounted on the vehicle frame.

The upper end of the arm 15 is formed with a transversely slotted end 23 in which is secured a bushing 24 which is internally threaded, one end of the threaded bushing being closed by a cap 25 provided with a suitable lubricating fitting.

An arm 26 of substantially U-shaped formation is formed with a threaded end 27 which extends into the threaded orifice of the bushing 24 and is adapted to oscillate therein.

The other end 28, the axis of which is parallel to the axis of the end 27 is formed with a threaded extremity 29 which has a rotating bearing in a bushing 30 mounted in the bracket 22 and is also provided with a threaded area 31 of larger diameter than the threaded extremity 29 which has a threaded bearing in a bushing 32, also mounted in said bracket.

The bushing 24 which is illustrated substantially full size in Figures 4 and 5, is eccentrically mounted in the slotted end 23 of the arm 15 and is provided with a nut-shaped flange 33 by means of which it may be readily turned and a clamping bolt 34 extending across the slot of said arm clamps the bushing tightly in any desired position.

It will be readily appreciated that by rotating the eccentric bushing in its support in the arm 15 which carries the king pin or knuckle support for the wheel assembly, the angular position of the arm 15 may be altered with a very great degree of accuracy.

The arm 15 is provided with a cylindrical orifice 35 in which is mounted the boss end 36 of the king pin bracket 37.

The arm 15 is slotted above the orifice 35 and a clamping bolt 38 extends across the slot so as to tighten the boss end of the king pin bracket and hold it snugly.

The boss end 36 of the king pin bracket is recessed intermediate of its length so that its cross section in the central region is of a cross form and a pair of stop screws 39 are threaded into the arm 15 from either side to abut one of the webs of the cross to hold it rigidly in a fixed adjustment. By means of these screws an adjustment for the "castor" of the wheel assembly can be very accurately made, it being merely necessary to loosen the bolt 38 and adjust the screws 39 as may be desired from either side after which the clamping bolt 38 is again tightened so that the arm binds on the periphery of the boss end 36.

In the form of structure illustrated in Figure 3 the upright arm 15' and U-arm 26' are substantially the same as the structure illustrated in Figure 1, but the connection between the lower support of the arm 15' and the vehicle frame is in this instance in the form of a pair of leaf springs 40 and 40'. (See Figures 11 and 12.)

The leaf springs 40 and 40' extend transversely of the vehicle frame and are suitably secured thereto in side-by-side relation and they each preferably have two main lower leafs which at the ends are bent into eye form.

Referring now particularly to the structure shown in Figure 11, I insert a pin 42 through the adjacent spring eyes 41 and this pin is preferably externally threaded and bushings 43 are threaded onto the ends of the threaded pin and are suitably locked in the respective spring eyes, preferably by means of a locking thread 44. The pin may, if desired, be plain surfaced rather than engaged in threaded contact with the bushings, such as is shown in Figure 12, and the lower end of the upright arm 15' is mounted on the pin 42 intermediately between the eyes.

It will be readily appreciated that in practice it will be difficult or too expensive to manufacture springs of sufficiently close tolerance for the distance between spring eyes so that the eyes of one spring would align axially with those of the other when assembled on the frame, and in order to offset this objection and to provide for ease of assembly I form one end portion of the pin 42 slightly eccentric to the other end so that the mis-alignment of the spring eyes will be compensated for as illustrated in exaggerated scale Figure 11.

In assembling the eccentric pin and bushings in this case, one bushing will be first inserted in position with the pin in position therein whether threaded or unthreaded and the other eccentric end of the pin will extend through the eye of the other spring. The pin is then rotated so that the free end thereof is brought into substantial concentric relation with the said other spring eye whereupon the other bushing may be threaded or inserted into position.

In the modified form of means shown in Figure 12, the pin 42' is shown of plain form and one of the bushings 43' is made eccentric and rotatably adjustable in the spring eye so that any misalignment of the latter may be readily compensated for by rotating said eccentric bushing so that the pin which will be first inserted in the eccentric bushing may be brought into concentric relation with the eye of the other spring, whereupon the concentric bushing 43" may then be threaded or inserted into place in the eye of the said other spring. Excessive binding of the pin in the respective spring eye bushings is thus avoided.

An air or hydraulic plunger check device 45 is here shown pivoted at its upper end to an upstanding frame bracket 22' and the lower end is suitably secured in a flexible manner to an inwardly projecting portion 46 of the lower extremity of the arm 15'.

It is important to note that the U-shaped upper arm 26 or 26' will, due to its bowed form and resilient nature, and the fact that it constitutes the sole means of directly connecting the upper end of the upright arm 15 or 15' with the frame bracket 22 or 22', present a certain degree of resiliency between said arm and the frame bracket so that a relief will be provided at this point by the flexing of the single U-arm to relieve the structure of strain caused by excessive road shocks.

It is to be further noted that the flexibility of the single U-arm permits a "castor" adjustment to be effected by simply shifting the axial position of the bushing 24 in relation to the upright or in the form shown in Figure 5, the bushing being rotatably held against axial displacement by co-operation of the clamp bolt 34 with the grooved periphery, rotation of the bushing will, by reason of its threaded connection with the upper arm, effect the desired rocking of the upright. This can be accomplished by rotating the bushing one or more complete turns in the bracket 23 in the case of an eccentric bushing and thereby effect a proportionate rocking of the upright arm 15 or 15', and since the springs 40 are flexible and the bowed arm 26 or 26' also flexible to a degree, there will be no rigid opposition to the rocking adjustment of the king pin supporting arms 15 or 15', so that if desired a "castor" adjustment may be achieved simply by manipulating the bushing 24, either in combination with the castor adjusting feature of the element 37 or independently of any other castor adjustment.

Further, while I have shown the bushing 24 as being eccentric for the purpose of "camber" adjustment of the arm 15 or 15', this bushing may be made concentric solely for "castor" adjustment and other suitable provision made for effecting "camber" adjustment.

While I have described the bushing 24 as eccentric and threaded on the end 27 of the U-shaped arm, I may vary the relation of the elements 23—24—27 in several ways, such as by threading the bushing (plain or eccentric) in the element 23 in conjunction with a plain or threaded engagement with the arm end 27, or I may mount the bushing 24 for sliding adjustment to the end that I may provide at this point for "castor" adjustment either combined with or independent of "camber" adjustment, as may be desired, but in all cases it will be noted that the flexibility of the single upper arm will permit the castor adjusting rocking of the upright element without requiring special swivel connections or the like and the slight tension or torsion set up in the upper arm will be advantageous in retaining the bearing surfaces at either end in intimate contact compensating for wear or looseness and preventing rattling.

The structure described is extremely simple and practical and permits of a material reduction in manufacturing costs through the elimination of close and expensive manufacturing tolerances. It also permits a greater movement of the springs and relieves the bearings of excessive binding loads.

What I claim as my invention is:—

1. An independent wheel suspension for motor vehicles comprising an upright floating member adapted to mount a king pin and wheel axle, means flexibly connecting said upright floating member at one end with the vehicle frame, a single bowed arm forming an inherently yieldable or flexible connection between the other end of said upright floating member and the vehicle frame, and an eccentric bushing threadedly interposed between the said upright member and said single bowed arm and threadedly adjustable to simultaneously tension said bowed arm and vary the angular position of said upright member.

2. An independent wheel suspension for motor vehicles comprising an upright floating member adapted to mount a king pin and wheel axle, means flexibly connecting said upright floating member at one end with the vehicle frame, a single curved or U-shaped arm having one end oscillatably mounted on the vehicle frame and having the outer end threaded, and a bushing adjustably mounted in the other end of said upright floating member and threadedly engaging the threaded end of said U-shaped arm in oscillative bearing contact, said U-shaped arm being inherently sufficiently flexible or yieldable on the adjusting of said bushing to permit the rocking of said upright floating member.

3. An independent wheel suspension for motor vehicles comprising an upright floating member having a king pin and wheel axle connected therewith, means flexibly connecting said upright floating member at one end with the vehicle frame, a single curved arm forming a nonrigid flexible connection between the other end of said upright floating member and the vehicle frame, and an eccentric bushing rotatably retained against axial displacement in said floating arm and having a threaded bearing connection with the adjacent end of said single curved arm,—said curved arm being inherently sufficiently flexible to permit rotative adjustment of the bushing to control both the "camber" and "castor" angle of the king pin.

4. A wheel suspension for motor vehicles, comprising the combination with the wheel axle and the vehicle frame, of a curved or U-shaped arm having threaded bearing portions adjacent one of its ends, threaded bearing supports mounted on the frame and engaging the threaded portions of the said end of the U-shaped arm, the other end of said U-shaped arm being threaded, a bushing threaded on the outer end of said U-shaped arm, an upright arm carrying the latter bushing and extending downwardly from the U-shaped arm and adapted to support the wheel axle, and an arm flexibly mounted on the lower end of the aforesaid upright arm and extending inwardly and connected to the frame.

5. A wheel suspension for motor vehicles, comprising the combination with the wheel axle and the vehicle frame, of an upwardly extending axle-supporting member, an arm of inherently flexible form connected to the upper end of said upright arm and pivotally connected to the vehicle frame, a leaf spring rigidly secured to the frame and pivotally connected to the lower end of said upright arm, and means for relatively adjusting the connected portions of said axle-supporting member and said flexible arm to rock said supporting member in a fore and aft plane in opposition to the resiliency of said leaf spring and said arm connected thereto.

6. A wheel suspension for motor vehicles, comprising the combination with the wheel axle and the vehicle frame, of an arm pivotally secured to the frame to swing in a vertical plane, an arm pivotally secured to the outer end of the aforesaid arm and extending downward therefrom, means flexibly connecting the lower end of said vertical arm with said frame, a king pin bracket having a cylindrically surfaced boss provided with a lug portion, said downwardly extending arm having a cylindrical recess to receive said boss, a pair of set screws threaded in said vertical arm and adapted to engage the lug portion of said boss on either side to definitely position same, means for clamping said cylindrical boss in said vertical arm, and a wheel axle mounted on said king pin bracket.

7. An independent wheel suspension for motor vehicles comprising in combination an upright floating member having a wheel mounting axle thereon, guide means flexibly connecting one end of said member with the vehicle frame, a unitary bracket secured to the frame having widely spaced bearings, a single unitary rod oscillatably mounted in said spaced bearings and having its ends extending a short distance therebeyond, and a pair of separate support arms pivotally linked with the lower end of said upright floating member and having their inner ends diverging and fitting respectively on the ends of said common oscillatable rod and clamped rigidly thereto, whereby said support arms may be individually assembled on and removed from said common oscillatable rod without removal of the rod or bearing members.

8. An independent wheel suspension as claimed in claim 7 in which the bearing portions of said oscillatable rod comprise enlarged threaded sections having threaded bearing engagement with threaded bushings secured in said bracket, the outer ends on which the arm ends are clamped being of reduced cross section whereby the said rod may be first threaded longitudinally into bearing relation with the respective bushings after which the said arms may be mounted thereon at the outward sides of the bearings and whereby said arms may be subsequently readily removed from their common oscillatable support without disturbing the threaded bearing relation of the parts.

9. In a vehicle the combination with the frame, of a pair of leaf springs arranged transversely of said frame having bearings at the outward ends, and means for supporting a wheel assembly mounted in said bearings between said paired springs, and means for adjusting the axes of said bearings to permit a free-acting hinge action and to true up the vehicle wheels.

10. A device as claimed in claim 9 having eccentrically adjustable means for compensating for mis-alignment of said spring bearings to permit the trueing of the vehicle wheels.

11. An independent wheel suspension for motor vehicles comprising an upright floating member adapted to have a king pin and wheel axle connected therewith, means flexibly connecting said upright floating member at one end with the vehicle frame, a single resilient arm extending in a curved path and forming a direct inherently yieldable flexible connection between the other end of said upright floating member and the vehicle frame, and means adjustable to simultaneously tension said single arm and tilt said upright floating member to an adjusted position.

12. An independent wheel suspension for motor vehicles comprising an upright floating member adapted to have a king pin and wheel axle connected therewith, means flexibly connecting said upright floating member at one end with the vehicle frame, a single resilient arm extending in a curved path and forming a direct inherently yieldable flexible connection between the other end of said upright floating member and the vehicle frame, and means forming bearing connections between the respective ends of said arm and the frame and upright floating member including a bearing bushing adjustable to simultaneously tension said single arm and tilt said upright floating member to an adjusted position.

13. In an independent wheel suspension for motor vehicles, the combination of an upright wheel-supporting member, and means flexibly connecting said member with the vehicle frame including a link having a transversely extending intermediate portion and integral substantially parallelly offset end portions both disposed in substantially right-angular intersecting relation to a common transverse plane and having bearing connection at the ends with the frame and upright member, the frame bearings being arranged to support said link for a considerable length in the fore and aft direction compared to the bearing of the upright member in a bracing manner, said link comprising the sole means directly connecting one end of said upright member with the frame and being inherently of a resilient nature and adapted to flex under applied stresses.

14. In an independent wheel suspension for motor vehicles, the combination of an upright wheel-supporting member, and means flexibly connecting said member with the vehicle frame including a link having a transversely extending intermediate portion and integral substantially parallelly offset end portions both disposed in substantially right angular intersecting relation to a common transverse plane and pivotally connected respectively with one end of said upright member and with the frame, said link comprising the sole means directly connecting one end of said upright member with the frame and being inherently of a resilient nature and adapted to flex under applied stresses, and means adjustably interposed between said upright member and the respective end of said link and adjustable to simultaneously tension said link and tilt said upright wheel supporting member.

15. Means as claimed in claim 13 in which said link comprises a length of steel bar bent into curved formation adjacent each end with said end portions forming bearing extensions beyond the curved formations one of said end portions being of considerably greater length and of heavier cross section in part at least than the other.

16. In an independent wheel suspension for motor vehicles having a floating wheel support, a supporting link therefor formed of a single length of steel with the ends thereof turned laterally and provided with threaded bearing surfaces, the axes of the threaded bearing end portions being disposed in substantially right-angular intersecting relation to a common plane for threaded oscillative connection respectively with the vehicle frame and floating wheel support, the threaded bearing surfaces of one of said end portions being spaced apart in stepped relation.

17. In a suspension for a steering ground wheel of a motor vehicle, wheel supporting means and wheel displacement guiding means flexibly and adjustably connecting the aforesaid means with the vehicle frame including an element manually adjustable about an axis disposed in the fore and aft direction for simultaneously adjusting the caster and camber of the wheel.

18. In a suspension of the independent type for a steerable ground wheel of a motor vehicle having a frame structure, wheel supporting and guiding means for swingingly connecting said steerable wheel to said frame structure and including a pair of members, one of said members having an opening extending in the fore and aft direction, the other of said members having a threaded portion disposed in the fore and aft direction within said opening, and an eccentric bushing fitting within said opening with its eccentric axis disposed in the fore and aft direction and being internally threaded concentrically of said eccentric axis to receive said threaded portion of said other member, said bushing when rotatably adjusted in said opening about said fore and aft axis providing for relative displacement of said members to vary the normal position of said steerable wheel with respect to said frame structure, said supporting and guiding means including means for swingingly connecting one of said members to said frame structure.

19. In a suspension for a steerable ground wheel of a motor vehicle, wheel supporting means, means for guiding rising and falling movements of said wheel supporting means and said wheel independently of the remaining ground wheels of the vehicle, and means including a single adjustable element rotatable about an axis disposed in the fore and aft direction of the vehicle and operably associated with at least one of the first two said means and adapted when rotated about said axis to vary the caster and camber of said wheel in response to manual adjustment of said element.

20. In an independent suspension for a steerable ground wheel of a motor vehicle, a substantially upright knuckle bracket arm, a plurality of link means respectively articulated between the frame of the vehicle and the upper and lower ends of said arm, and an adjustable element rotatable about an axis disposed in the fore and aft direction of the vehicle and operably associated with said suspension to displace one end of said arm transversely and longitudinally of the vehicle relative to the link means articulated to such arm end on rotation of said element about said fore and aft axis to vary the camber and caster of the wheel.

21. In a suspension for a steerable ground wheel of a motor vehicle, wheel supporting means, means for guiding rising and falling movements of said wheel supporting means and said wheel independently of the remaining ground wheels of the vehicle, and means including a rotatable eccentric bushing rotatable about an axis disposed in the fore and aft direction of the vehicle and operably associated with at least one of the first two said means and adapted on rotation of said bushing about said fore and aft axis to vary the caster and camber of said wheel.

22. In combination, a vehicle frame, a vertically arranged wheel supporting member, means movably connecting one end of the member to the frame, an arm extending laterally between the other end of the member and the frame and having an offset bent outer end directed longitudinally of the frame, bearing means on the frame engaging the inner end of the arm, the offset end being threaded and the other end of the supporting member having an opening larger than and receiving such threaded end of the arm, a bushing rotatably adjustable in said opening and having pivotal threaded engagement with the threaded engagement with the threaded offset end of the bar, said bushing being peripherally grooved, and means for holding the bushing against rotation in the opening including a clamping bolt fitting in said groove to lock the bushing against axial displacement in said opening.

23. In combination, a vehicle frame, a vertically disposed wheel supporting member, means connecting one end of the member to the frame, and means pivotally connecting the other end of the member to the frame and comprising a laterally extending arm having its outer end bent to provide an offset bearing portion directed longitudinally of the vehicle, a pair of aligned bearings mounted on the frame in fore and aft spaced relation and oscillatably engaging the said arm at points spaced in the fore and aft direction, and bearing means on the upper end of the member and pivotally embracing the offset portion, said bar constituting the sole direct connection between the frame and the said other end of the mounting member.

24. In combination, a vehicle frame, a vertically disposed wheel supporting member, means connecting one end of the member to the frame, link means for connecting the other end of the member to the frame and including a laterally extending arm having offset, parallel and threaded ends extending longitudinally of the frame, a pair of threaded bearings on the frame spaced apart and aligned in the longitudinal direction and engaging one of said offset ends at points spaced longitudinally in the length thereof, and threaded bearing means on the other end of the supporting member engaging the other offset end, the latter engagement between the arm and supporting member constituting the sole connection between the link means and the supporting member.

25. In a suspension for a steering ground wheel of a motor vehicle, wheel supporting means, wheel displacement guiding means, and a connection between the wheel supporting means and the wheel displacement means comprising a manually adjustable means having an eccentric portion for effecting camber adjustment and having threaded portions for simultaneously effecting caster adjustment.

JOHN WYCLIFFE LEIGHTON.